United States Patent [19]

Sukup

[11] 4,161,334
[45] Jul. 17, 1979

[54] PROTECTIVE APPENDAGE FOR A STEERING COLUMN

[76] Inventor: Richard A. Sukup, 7456 Meadowcrest, Fort Worth, Tex. 76112

[21] Appl. No.: 902,973

[22] Filed: May 4, 1978

[51] Int. Cl.² .............................................. B62D 25/08
[52] U.S. Cl. ..................................... 296/1 R; 180/90; 70/449
[58] Field of Search .................. 296/95 R, 70, 74, 1 R; 180/90; 70/447, 448, 449, 450, 451

[56] References Cited

U.S. PATENT DOCUMENTS

| | | | |
|---|---|---|---|
| 2,439,476 | 4/1948 | Leggett | 180/90 |
| 2,635,839 | 4/1953 | Jacobi | 180/90 |

Primary Examiner—Philip Goodman
Attorney, Agent, or Firm—Charles W. McHugh

[57] ABSTRACT

A protective appendage for the steering column of an automobile, made of a thin and semi-flexible material which is adapted to surround the area in the vicinity of the ignition key lock. The appendage is preferably thermo-formed from a clear plastic such as polyethylene or polyvinyl chloride. The base of the appendage is curved into an arc of a circle having a diameter of about four inches, so that it will snugly fit against a steering column having a diameter of about 3½-4 inches. The appendage is installed by temporarily deforming a cylindrical shell of semi-flexible material and forcing it over the lock assembly; the shell is subsequently locked in position by the protruding arms of the lock assembly.

8 Claims, 6 Drawing Figures

PROTECTIVE APPENDAGE FOR A STEERING COLUMN

This invention relates to an appendage for protecting the steering column of an automobile from unwanted scratches in the vicinity of the ignition key lock assembly.

There are many persons who may be categorized as "fastidious" about the appearance of their automobiles—especially those who are owners of rare or unusual automobiles. Such vehicle owners are disappointed when even the smallest scratch is realized on a decorative surface. And, one area of a vehicle that has been particularly susceptible to scratches in the past is that area immediately adjacent and below the locking assembly on the steering column of an automobile. The reason that this area is so prone to receiving scratches is the extra keys on a person's key ring typically hang below the lock assembly, where they swing to and fro whenever a moving automobile hits a bump or chug hole, etc. It would be desirable, therefore, to be able to protect the area around the lock assembly so that extra keys would not scratch the paint on the steering column.

Another reason for wanting to add a protective shield around the lock assembly is the offensive noise that is often made by metal keys rubbing against the metal steering column. While the occasional impact of a few keys striking a steering column may be routinely tolerated by most people, even a small noise can become offensive if it is repeated often enough. Hence, it would be desirable to have a sound-dampening structure below a lock assembly, such that the new structure would tend to damp any obnoxious sounds which would occur when a key swings against a steering column.

Accordingly, it is an object of this invention to provide a protective element which will preclude damage to the paint on a vehicle steering column which might otherwise be caused by key abrasion.

A further object is to provide a protective cover or guard which is molded so as to intimately embrace the steering column, in order to give the cover the appearance of a portion of the original equipment of the vehicle—rather than the appearance of an add-on appendage.

One more object is to provide a protective element which can be installed on a steering column with only one practical orientation, whereby it will be almost impossible for a person to install the element in a way that was not intended by the manufacturer.

It is another object to provide a protective element which is serviceable on essentially all automobiles having a similar structural configuration—by virtue of making the protective element neutral in color—and preferably transparent.

Still another object is to provide a protective element which is easy to apply but which is similarly easy to remove for cleaning and the like. These and other objects will be perhaps better appreciated from a thorough review of the specification and the claims appended thereto, as well as the drawings provided herewith in which:

In brief, the invention includes a base member of sheet material or the like which is formed in the arc of a circle—so as to be categorized as "cylindrical." The radius of said base member is preferably about two inches, so that it will be compatible with the steering columns of modern automobiles (which have a diameter of about four inches). The included angle of the arced base member is preferably within the range of about 100–180 degrees. Attached to the base member and extending outwardly therefrom is a cylindrical shell of semi-flexible material. The shell has a length which is sufficient to enclose the lock assembly on a steering column, and it has a diameter which is less than the length between the two extreme portions of the protruding arms of said lock assembly. By temporarily squeezing the cylindrical shell during installation, it can be passed over the arms of the lock assembly; when the shell is relaxed, it will be captured by said arms and held securely in place.

Figure 1:
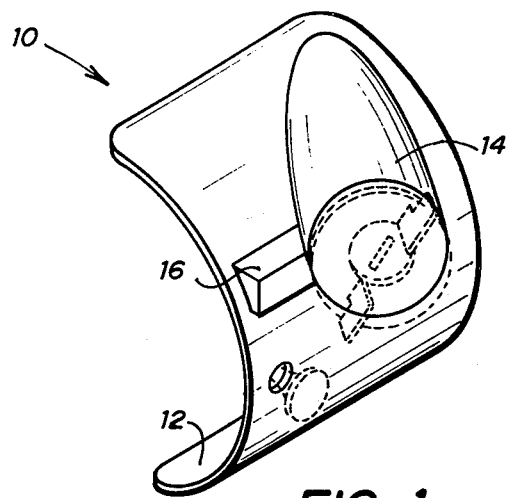
FIG. 1 is a perspective view of one embodiment of a protective device in accordance with the invention.

Referring initially to FIG. 1, the protective appendage 10 for the steering column of an automobile includes a base member 12 comprising a sheet of material which is formed in an arc so as to be accurately describable as cylindrical. The radius of the formed member 12 in its unmounted condition (i.e., before being affixed to a steering column) is preferably approximately two inches. With such a radius, the base member 12 may readily surround a portion of the steering column (adjacent the lock assembly) which has a diameter within the range of about 3½ to 4 inches. The material from which the base member 12 is formed is preferably at least somewhat resilient, and the term "semi-flexible" is frequently used to describe such materials. Ideally, the material is also essentially transparent, i.e., "clear," in order that the underlying color of the steering column will show through the member 12. By making the member 12 clear, a single element 10 can be used on all vehicles having appropriate structural dimensions—regardless of the interior color scheme in the automobile. A preferred material is the semi-flexible PVC thermoplastic resin, such as that marketed by B. F. Goodrich under the trademark "Geon."

The included angle of the cylindrical portion will typically be on the order of 110 to 180 degrees; and the length of said base member 12 (as measured in a direction parallel to the longitudinal axis of the steering column) will typically be about three inches.

Attached to and extending outwardly from the base member 12 is a cylindrical shell 14 of semi-flexible material. In practice, it will normally be desirable to cast the base member 12 and the cylindrical shell 14 as a unitary body, so that both will be made of the same material. However, the semi-flexible property of the material used in the cylindrical shell 14 is really of more importance than the material used in the base member. The thickness of both the base member 12 and the cylindrical shell 14 is preferably within the range of about 0.090-0.120 inch, although a slightly thinner section might be serviceable in some parts of the shell. One reason for wanting a thickness of at least 0.090 inch is to achieve at least some rigidity in the appendage 10 without using a hard material. Since the appendage could routinely be struck by keys hanging below the ignition key receptacle, it is preferred that the material of base 12 be formed of a sound-damping resilient plastic. With such a construction, the appendage 10 will not only be pleasing to the eye, it will also lower noise level in an operating vehicle.

Figure 4:
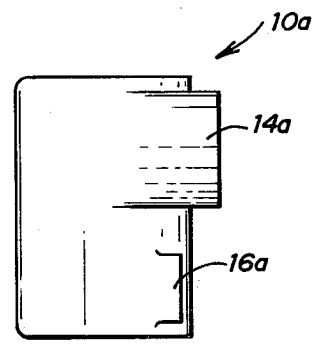
FIG. 4 is a top view of another embodiment of the invention which is particularly adapted for tilt/telescoping steering columns.
Figure 5:
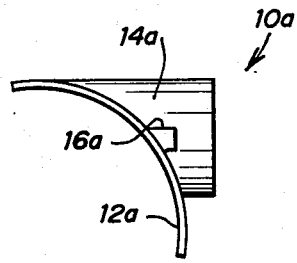
FIG. 5 is an end view of the device shown in FIG. 4.

The shell 14 has a length which is sufficient to enclose the lock assembly which is standard equipment on the steering column of a modern automobile. For example, as seen in FIGS. 4 and 5, the shell 14 extends outwardly for a distance of about two inches at its top and about one half inch at its bottom. The shell 14 terminates just short of the position occupied by the protruding arms of a standard lock assembly. The diameter of the shell 14 (when in its relaxed position) is less than the length between the two extreme portions of the protruding arms of the lock assembly. It will be perhaps appreciated now why the cylindrical shell is made at least somewhat flexible. That is, the shell must be sufficiently flexible so that it can be temporarily squeezed to an elongated cross section (like an elipse) which is long enough to pass over the two locking assembly arms. Having cleared the arms, the cylindrical shell 14 must then be sufficiently resilient as to return to its original cylindrical shape, so that it will be held in place by the lock assembly arms.

The protective appendage 10 also includes, preferably, a section 16 which is integrally formed with the base member 12—for the purpose of covering any irregular portion of the lock assembly, i.e., that portion which typically protrudes from the cylindrical surface of the steering column and presents the word "LOCK." Such an integrally formed protuberance 16 permits the base member 12 to fit flush against the cylindrical steering column, so that there is no opportunity for dirt, dust and the like to get behind (or under) the base member 12. In this regard, the construction disclosed herein is an improvement over other so-called protective devices like the "Automobile Door Protector" shown in U.S. Pat. No. 1,810,510 to Winne. That is, the Winne construction has as one of its objects the protection of the interior of an automobile door; but his disc-shaped protector fits very loosely upon a cylindrical shaft, and it will readiy accumulate dirt and the like behind it. To insure cleanliness around a steering column, then, a snug fit is desirable between the protective appendage 10 and the structure it is designed to protect—as disclosed herein.

Figure 2:
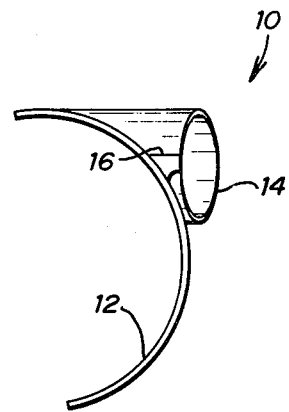
FIG. 2 is an end view of the device shown in FIG. 1, as seen from a direction which is coincident with the longitudinal axis of the steering column.
Figure 3:
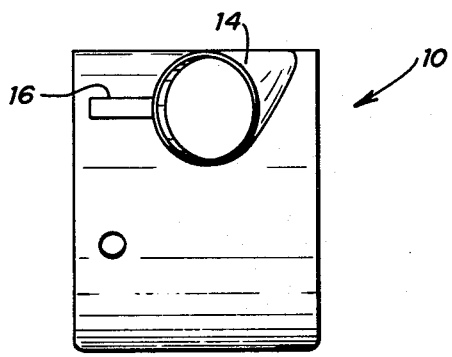
FIG. 3 is a front, elevational view of the device shown in FIG. 1.
Figure 6:
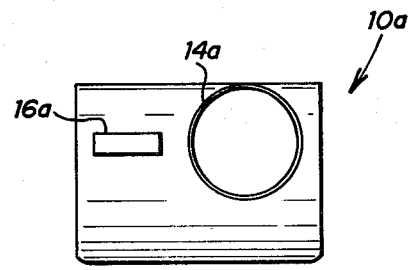
FIG. 6 is a front, elevational view of the protective device shown in FIG. 4.

With regard to the differences which should be apparent between the two embodiments shown in the drawing, the embodiment shown in FIGS. 1, 2 and 3 is designed for use with a fixed steering column, wherein the ignition key assembly typically makes an angle of about 70 degrees with respect to the center line of the steering column. The embodiment shown in FIGS. 4, 5 and 6 is intended for use on those automobiles having a tilt or telescopic steering column, wherein the ignition key assembly is mounted at about 90 degrees with respect to the center line of the steering column.

While only two embodiments of the invention have been described herein in great detail, it should be apparent to those skilled in the art that other variations on the general concept might be made—without departing from the spirit of the invention. Accordingly, the breadth of the invention should be understood to be bounded only by the claims appended hereto.

What is claimed is:

1. A protective appendage for the steering column of an automobile, with the column having thereon a lock assembly for the ignition key, comprising:
    (a) a base member comprising a sheet of material which is formed in the arc of a circle so as to be categorized as cylindrical, and the radius of said formed member being apprximately 2 inches, such that the base member may surround a portion of the steering column adjacent the lock assembly, and the included angle of the cylindrical portion being within the range of about 110°-180°, and the length of said base member (as measured in a direction parallel to the longitudinal axis of the steering column) being about 3 inches; and
    (b) a cylindrical shell of semi-flexible material attached to and extending outwardly from the base member, and said shell having a length which is sufficient to enclose the lock assembly and having a diameter which is less than the length between the two extreme portions of the protruding arms of the lock assembly, and the cylindrical shell being sufficiently flexible so that it may be temporarily squeezed to an elongated cross section which is long enough to pass over said two arms, and said shell being sufficient resilient so as to return to its original cylindrical shape after passing over the arms, whereby said shell may be held in place by the lock assembly arms after the shell has been passed over said arms.

2. The protective appendage as claimed in claim 1 wherein the base member and the cylindrical shell are integrally molded of the same semi-flexible material.

3. The protective appendage as claimed in claim 1 wherein both the base member and the cylindrical shell are formed of semi-flexible and nearly transparent material.

4. The protective appendage as claimed in claim 1 wherein both the base member and the cylindrical shell are thermo-formed from either polyethylene or polyvinyl chloride.

5. The protective appendage as claimed in claim 1 wherein the base member is formed from of a sound-damping resilient plastic, whereby any keys which may be hanging from a key ring adjacent the lock assembly will not create an offensive noise if they are brushed against said base member.

6. The protective appendage as claimed in claim 1 wherein the thickness of both the base member and the cylindrical shell is within the range of about 0.090-0.120 inch.

7. The protective appendage as claimed in claim 1 wherein the base member is formed of semi-flexible material, whereby said member may be bent in order to snugly surround a portion of a steering column having a diameter within the range of about 3½ to 4 inches.

8. The protective appendage as claimed in claim 1 and further including an integrally formed cover for any irregular portion of the lock assembly, such that there is no painted surface which could be scratched by a key hanging from a key ring adjacent the lock assembly, and such that there is no gap between the protective appendage and the steering column which might receive and accumulate dirt.

* * * * *